US012176573B2

(12) United States Patent
Li et al.

(10) Patent No.: US 12,176,573 B2
(45) Date of Patent: Dec. 24, 2024

(54) BATTERY SEPARATOR COATING MATERIAL, PREPARATION METHOD THEREFOR AND USE THEREOF

(71) Applicant: SOUTH CHINA NORMAL UNIVERSITY, Guangdong (CN)

(72) Inventors: Weishan Li, Guangzhou (CN); Yucheng Wen, Guangzhou (CN); Huiyang Chen, Guangzhou (CN); Jiawei Chen, Guangzhou (CN); Yitong Lu, Guangzhou (CN); Yanxia Che, Guangzhou (CN)

(73) Assignee: SOUTH CHINA NORMAL UNIVERSITY, Guangdong (CN)

( * ) Notice: Subject to any disclaimer, the term of this patent is extended or adjusted under 35 U.S.C. 154(b) by 561 days.

(21) Appl. No.: 17/605,430

(22) PCT Filed: Oct. 14, 2020

(86) PCT No.: PCT/CN2020/120968
§ 371 (c)(1),
(2) Date: Oct. 21, 2021

(87) PCT Pub. No.: WO2021/073545
PCT Pub. Date: Apr. 22, 2021

(65) Prior Publication Data
US 2022/0190436 A1    Jun. 16, 2022

(30) Foreign Application Priority Data
Oct. 18, 2019  (CN) .......................... 201910995240.2

(51) Int. Cl.
| | | |
|---|---|---|
| *H01M 50/426* | (2021.01) | |
| *H01M 4/131* | (2010.01) | |
| *H01M 4/133* | (2010.01) | |
| *H01M 4/485* | (2010.01) | |
| *H01M 4/505* | (2010.01) | |
| *H01M 4/525* | (2010.01) | |
| *H01M 4/583* | (2010.01) | |
| *H01M 10/0525* | (2010.01) | |
| *H01M 50/449* | (2021.01) | |

(52) U.S. Cl.
CPC ......... *H01M 50/426* (2021.01); *H01M 4/131* (2013.01); *H01M 4/133* (2013.01); *H01M 4/505* (2013.01); *H01M 4/525* (2013.01); *H01M 4/583* (2013.01); *H01M 10/0525* (2013.01); *H01M 50/449* (2021.01); *H01M 4/485* (2013.01)

(58) Field of Classification Search
None
See application file for complete search history.

(56) References Cited

U.S. PATENT DOCUMENTS

2013/0280611 A1    10/2013  Alkordi et al.

FOREIGN PATENT DOCUMENTS

| CN | 108336279 | | 7/2018 |
|---|---|---|---|
| CN | 108428839 | | 8/2018 |
| CN | 108428839 A | * | 8/2018 |
| CN | 108511784 | | 9/2018 |
| CN | 108649173 | | 10/2018 |
| CN | 110165124 | | 8/2019 |
| CN | 110739427 | | 1/2020 |
| CN | 111554862 | | 8/2020 |

OTHER PUBLICATIONS

Qing Xu, Kailong Zhang, Jing Qian, Yu Guo, Xiaokai Song, Honglin Pan, Di Wang, and Xiaopeng Li. Boosting Lithium-Sulfur Battery Performance by Integrating Redox-Active Covalent Organic Framework in the Separator ACS Appl. Energy Mater. 2019, 2, 5793-5798), Supporting Information. (Year: 2019).*

Wen, Y. et al., "Covalent organic framework-regulated ionic transportation for high-performance lithium-ion batteries," Journal of Materials Chemistry A, 7, 2019, pp. 26540-26548. Cited in PCT International Search Report.

Yang, Y. et al., "Lithium bis(trifluoromethanesulfonyl)imide assisted dual-functional separator coating materials based on covalent organic frameworks for high-performance lithium-selenium sulfide batteries," Journal of Materials Chemistry A, 7, 2019, pp. 16323-16329. Cited in PCT International Search Report.

Shi, Q. X. et al., "Large-scaled covalent triazine framework modified separator as efficient inhibit polysulfide shuttling in Li-S batteries," Chemical Engineering Journal, 375, 2019, 13 pages. Cited in PCT International Search Report.

Xu, Q. et al., "Boosting Lithium-Sulfur Battery Performance by Integrating a Redox-Active Covalent Organic Framework in the Separator," ACS Applied Energy Materials, 2, 2019, pp. 5793-5798. Cited in PCT International Search Report.

(Continued)

*Primary Examiner* — Carlos Barcena
(74) *Attorney, Agent, or Firm* — HSML P.C.

(57) ABSTRACT

Provided is a method for preparing a battery separator coating material, the method comprising: dissolving PVDF and a covalent organic backbone material in an organic solvent and stirring same until uniform. The mass ratio of the PVDF to the covalent organic backbone material to N-methylpyrrolidone is 20:(70-85):(5-10). When the material is applied to preparation of a lithium ion battery separator, the problem of metal dissolution when a transition metal oxide is used as a positive electrode material can be effectively solved. The prepared separator can effectively adsorb metal ions and prevent the metal ions from being deposited on a negative electrode during charging and discharging processes, such that the cycle performance of a transition metal oxide positive electrode material is improved.

5 Claims, 3 Drawing Sheets

(56) References Cited

OTHER PUBLICATIONS

International Search Report issued for International Patent Application No. PCT/CN2020/120968, Date of mailing: Jan. 21, 2021, 7 pages including English translation.
Office Action issued for Chinese Patent Application No. 201910995240.2, dated Feb. 20, 2021, 10 pages including partial English translation.

* cited by examiner

BATTERY SEPARATOR COATING MATERIAL, PREPARATION METHOD THEREFOR AND USE THEREOF

CROSS REFERENCE TO RELATED APPLICATION

The present disclosure claims priority of Chinese patent application No. 201910995240.2, entitled "Battery Separator Material, Preparation Method Thereof and Use Thereof", and filed with the Chinese Patent Office on Oct. 18, 2019, the entire content of which is incorporated herein by reference.

TECHNICAL FIELD

The present disclosure relates to the field of battery materials, and particularly relates to a battery separator coating material, a preparation method thereof, and use thereof.

BACKGROUND

Lithium ion battery, as a secondary battery, has the advantages of high voltage, large specific energy, long cycle life, good safety performance, low self-discharge, high charging speed and so on. The lithium ion battery is currently a battery system with the best overall performance and a typical representative of modern high-performance of the battery, which is widely used for power support in the fields of information technology, electric and hybrid vehicles, aerospace and so on. The lithium ion battery has been developed for decades to date.

The lithium ion battery is composed of a cathode, an anode, a separator, and an electrolyte. Both the cathode and the anode can be made of materials capable of intercalation and deintercalation of lithium ions. Through the intercalation of the lithium ions into carbon, the anode can be formed. The cathode is generally made of $Li_xCoO_2$, or $Li_xNiO_2$ and $Li_xMnO_4$. The electrolyte is generally an organic solution obtained by dissolving $LiPF_6$ and other lithium salts in organic carbonates, such as ethylene carbonate (EC), dimethyl carbonate (DMC) and so on. Compared with other cathode materials for lithium ion batteries, transition metal oxides have significant advantages of high specific capacity (which can exceed 250 mAh/g), and are a strong competitor for the next generation high-specific-energy cathode materials, which have been attracted widespread attention in recent years.

Using transition metal oxides as cathode materials have the advantages of high specific capacity, better safety performance, and the like, but still have many more defects which are difficult to overcome, the most important of which is the stripping of transition metal ions. When a conventional electrolyte is used in lithium ion batteries, there is an obvious oxidation-reduction reaction between the electrolyte composition and the cathode materials under high temperature conditions. With continuous charging and discharging under high temperature conditions, the cathode material and the interface electrolyte continue to undergo oxidation-reduction reactions, even the electrolyte is decomposed, and metal ions are deposited on the anode, resulting in deterioration of the performance of the anode, and finally the lithium ion battery fails due to too low capacity.

SUMMARY

Accordingly, the present disclosure aims to provide a battery separator coating material and a preparation method thereof, which are used in lithium ion batteries to effectively inhibit the stripping of transition metal ions of cathode materials and improve a cycle performance of transition metal oxide cathode materials.

In order to achieve the aforementioned purposes, the specific technical solution of the present disclosure is as follows.

A method for preparing a battery separator coating material, including dissolving poly(vinylidene fluoride) (PVDF) and a covalent organic framework (COF) in N-methylpyrrolidone and uniformly stirring; and PVDF, COF, and N-methylpyrrolidone has a mass ratio of 20:(70-85):(5-10).

The present disclosure also provides a battery separator coating material, and the specific technical solution is as follows.

A battery separator coating material is prepared by the aforementioned preparation method.

The present disclosure also provides a battery separator, and the specific technical solution is as follows.

A battery separator is provided, a surface of which is coated with the aforementioned battery separator coating material.

The present disclosure also provides a method for preparing the aforementioned battery separator, and the specific technical solution is as follows.

A method for preparing a battery separator, including the following steps: coating the aforementioned battery separator coating material on a support;

the support is selected from one of a polyethylene film, a polypropylene film, and a polypropylene-polyethylene-polypropylene three-layer composite film.

The present disclosure also provides use of the aforementioned battery separator in the preparation of a lithium ion battery.

According to the aforementioned technical solution, the present disclosure has the following beneficial effects.

The coating material in the present disclosure is prepared by selecting PVDF and COFs and mixing them in a proper proportion, which is applied to the preparation of lithium ion battery separators, which can effectively solve the problem of metal stripping when the transition metal oxides are used as cathode materials. During charging and discharging, the prepared separator can effectively adsorb metal ions and prevent the metal ions from being deposited on the anode, thereby improving the cycle performance of the transition metal oxide cathode materials. Moreover, the specific capacity of the half-cell prepared by the battery separator using the coating material of the present disclosure is improved, the coulombic efficiency is also greatly improved, and the prepared half-cell obviously has more excellent stability and energy storage potential.

DETAILED DESCRIPTION OF THE EMBODIMENTS

Figure 1:
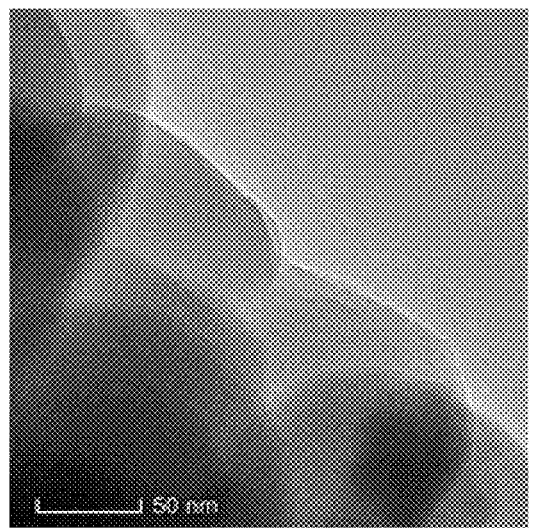
FIG. 1 is a scanning electron microscope (SEM) image of COFs obtained in Example 1.

In order to facilitate the understanding of the present disclosure, the present disclosure will be described in a more comprehensive manner with reference to the examples below, and preferred examples of the present disclosure are given below. However, the present disclosure may be embodied in many different forms and is not limited to the embodiments described herein. These examples are provided so that the understanding of the disclosure of the present disclosure will be more thorough and complete. It should be understood that the experimental methods for which specific conditions are not indicated in the following examples are usually in accordance with conventional conditions or in accordance with the conditions recommended by the manufacturer. Various common reagents used in the examples are all commercially available products.

Unless defined otherwise, all technical and scientific terms used herein have the same meaning as commonly understood by people who are skill in the art to which the present disclosure belongs. The terms used in the specification of the present disclosure is only for the purpose of describing specific examples, and is not intended to limit the present disclosure. The term "and/or" as used herein includes any and all combinations of one or more of the associated listed items.

A method for preparing a battery separator coating material according to the present disclosure includes: dissolving PVDF and a covalent organic framework in N-methylpyrrolidone and uniformly stirring; and PVDF, the covalent organic framework, and N-methylpyrrolidone has a mass ratio of 20:(70-85):(5-10). Among them, PVDF has good chemical stability and temperature characteristics, excellent mechanical properties and processability, and has a positive effect on improving the adhesive property. If other types of resins are used instead of PVDF, such as sodium carboxymethyl cellulose (CMC) and styrene butadiene rubber (SBR), CMC is too brittle, which will cause pole pieces to fall off, and the SBR has a poor dispersion effect, thereby negatively affecting the cycle performance of the material.

Specifically, the covalent organic framework is prepared by 1,3,5-tris(4-aminophenyl)benzene and 2,5-dimethoxy-1, 4-diformaldehyde benzene.

In one of the embodiments, a method for preparing the covalent organic framework includes the following steps: dissolving 1,3,5-tris(4-aminophenyl)benzene and 2,5-dimethoxy-1,4-diformaldehyde benzene in an organic solvent, ultrasonicating for 5 min to 10 min, adding acetic acid, and reacting at a temperature of 110° C. to 130° C. under an inert gas atmosphere to obtain a yellow precipitate; washing and drying to obtain the covalent organic framework. Among them, the reaction temperature is preferably 120° C. Preferably, the organic solvent is a mixed solution of 1,4-dioxane and mesitylene, which is beneficial to creating a good reaction atmosphere.

Preferably, an organic solvent is a mixed solution of 1,4-dioxane and mesitylene.

Preferably, the step of washing includes: washing with 1,4-dioxane, tetrahydrofuran, and absolute ethanol in sequence, and repeating 2 to 3 times. These good solvents remove impurities to improve product purity.

A battery separator coating material according to the present disclosure is prepared by the aforementioned preparation method.

A battery separator according to the present disclosure is provided, the surface of which is coated with the aforementioned battery separator coating material. Preferably, a coating thickness of the battery separator coating material is ranging from 50 μm to 80 μm. Too thick a coating tends to cause problems of large impedance and low first efficiency, and too thin a coating tends to cause uneven coating.

A method for preparing a battery separator according to the present disclosure includes the following steps: coating the aforementioned battery separator coating material on a support; the support is selected from a commercial separator Celgard 2320 (polypropylene-polyethylene-polypropylene three-layer composite film). This support has a uniform void structure and a high chemical and thermodynamic stability.

Use of the aforementioned battery separator in the preparation of a lithium ion battery, specifically including: placing the battery separator between a cathode piece and an anode piece of the lithium ion battery. Preferably, an active material of the cathode piece is lithium cobaltate, lithium manganate, lithium nickelate, lithium nickel manganate, lithium-rich or lithium iron phosphate; and/or an active material of the anode piece is artificial graphite, natural graphite, mesophase carbon microspheres or metallic lithium sheets.

Optionally, the lithium ion battery prepared by the aforementioned battery separator may be a button battery or a pouch battery.

EXAMPLE 1

Covalent organic frameworks (COFs) were prepared, raw material components were as follows by mass percentage:
 1,3,5-tris(4-aminophenyl)benzene (TPB) 54.6%,
 2,5-dimethoxy-1,4-diformaldehyde benzene (DMTP) 45.4%.

The specific steps of the preparation were as follows.

1,3,5-tris(4-aminophenyl)benzene (TPB) and 2,5-dimethoxy-1,4-diformaldehyde benzene (DMTP) were dissolved in organic solvents of 1,4-dioxane and mesitylene, and ultrasonicated, and the ultrasonic time was controlled for 5 min to 10 min. 1% to 3% acetic acid was added. Then, the mixture was reacted at 120° C. for 3 days under an inert protective atmosphere to obtain the product as a yellow solid. Finally, the obtained yellow solid was washed with 1,4-dioxane, tetrahydrofuran, and absolute ethanol repeatedly 2 to 3 times respectively, and then vacuum dried for 12 hours. The percentages were mass percentages.

Figure 2:
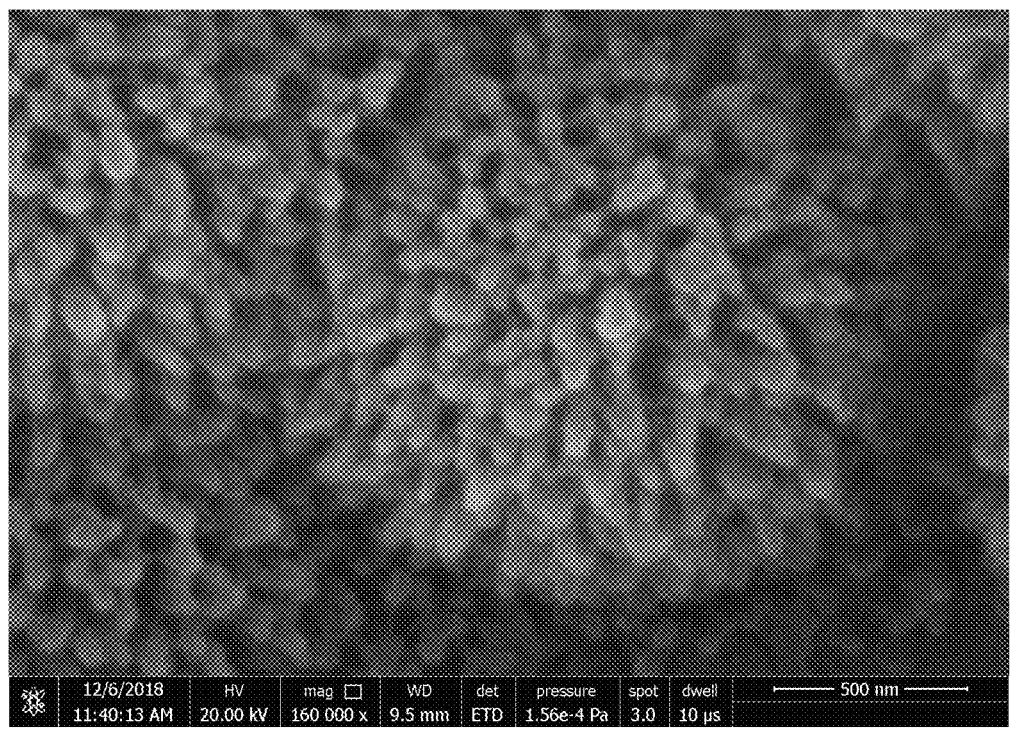
FIG. 2 is a transmission electron microscopy (TEM) image of COFs obtained in Example 1.
Figure 3:
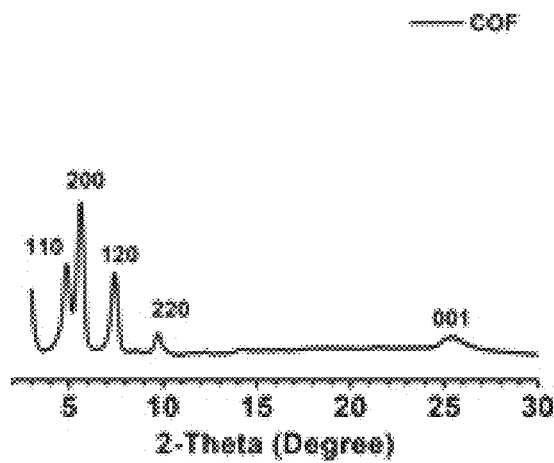
FIG. 3 is an X-Ray Diffraction (XRD) pattern of COFs obtained in Example 1.

A transmission electron microscopy image (TEM image) of the COFs is obtained after testing, as shown in FIG. 1, and a SEM image of COFs is obtained by scanning electron microscope, and a morphology is shown in FIG. 2, An XRD pattern of the prepared COFs is shown in FIG. 3. The TEM, SEM, and XRD patterns show that the COFs are a kind of crystalline material with abundant pores orderly arranged.

A COFs modified separator was prepared, raw material components were as follows by mass percentage:
 COFs 75%,
 poly(vinylidene fluoride) 20%,
 N-methylpyrrolidone 5%.

The specific steps of the preparation were as follows.

The aforementioned prepared COFs and poly(vinylidene fluoride) were dissolved in an organic solvent N-methylpyrrolidone, stirred in a homogenizer at room temperature for 1 hour to form slurry, and the obtained viscous solution was uniformly coated on a support and coated with a thickness of 60 microns, dried at 55° C. for 12 hours, and vacuum dried at 55° C. for 24 hours to form a COF modified separator. A sum of the mass percentages of COFs and poly(vinylidene fluoride) was 100%.

Celgard 2320 was selected as the support in this example.

EXAMPLE 2

Use of COFs Modified Separator: A Separator of a Lithium Ion Battery with NCM811 as Cathode Material The COFs modified separator prepared in Example 1 was cut into a diameter of 18 trim, and used as a separator for a lithium ion battery, and NCM811 was used as a cathode material to fabricate a battery.

Figure 4:
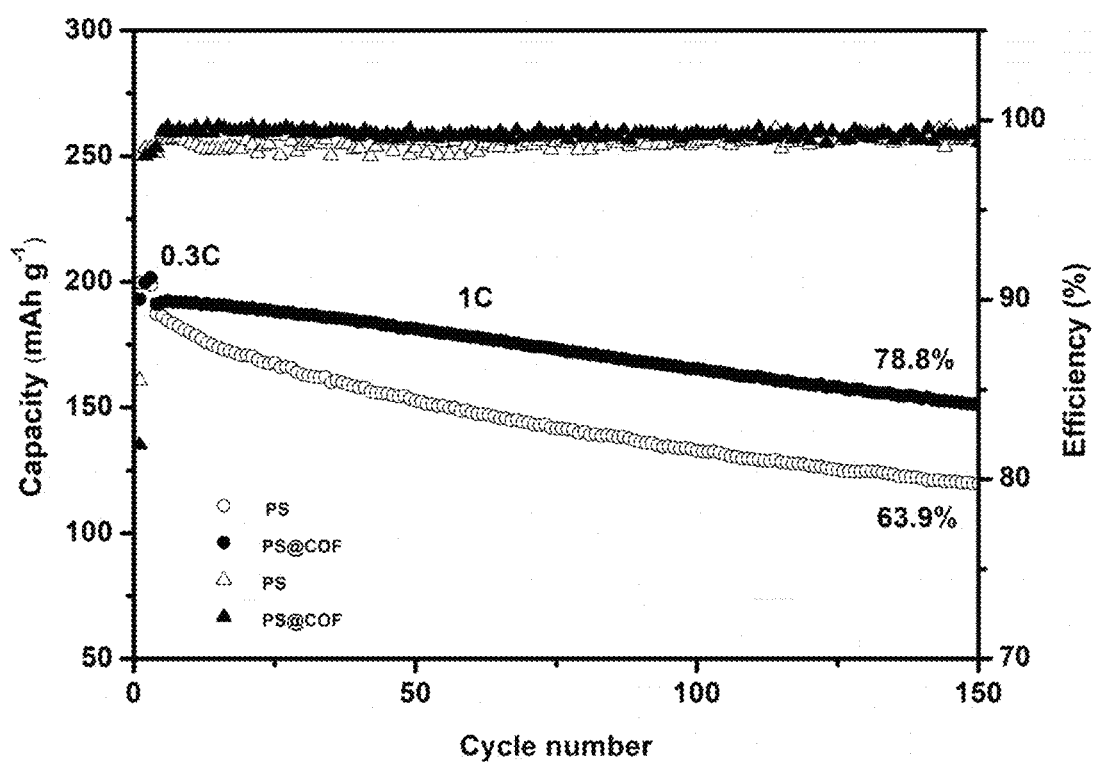
FIG. 4 is a battery charge-discharge cycle diagram of a lithium ion battery with $LiNi_{0.8}Co_{0.1}Mn_{0.1}O_2$ (NCM811) as a cathode material in which the COFs modified separator is applied according to Example 2.

A cyclic voltammetry measurement was performed after the separator was assembled into a battery. FIG. 4 is a cycle diagram of NCM811. It can be seen by comparison that at normal temperature, 3 charge-discharge cycles were carried out on a half-cell prepared by the separator synthesized by mixing the COFs and a half-cell prepared by not mixing the COFs at a rate of 0.3 C, a specific capacity was maintained at about 200 mAh/g and a coulombic efficiency was 100% after 3 cycles. It can be found that when the two batteries were subjected to 150 charge-discharge cycles at a rate of 1 C, the specific capacity of the half-cell prepared by this method was 200 mAh/g to 150 mAh/g, while the specific capacity of the half-cell prepared by the general method was 120 mAh/g to 115 mAh/g. After 150 cycles, the coulombic efficiency of the former was 78.8%, while the latter was 63.9%, indicating that the half-cell synthesized by the separator prepared by the method can have more excellent stability and energy storage potential.

EXAMPLE 3

Use of COFs Modified Separator: A Separator of a Lithium Ion Battery with Lithium-Rich as Cathode Material The COFs modified separator prepared in Example 1 was cut into a diameter of 18 mm, and used as a separator for a lithium ion battery, and lithium-rich was used as a cathode material to fabricate a battery.

Figure 5:
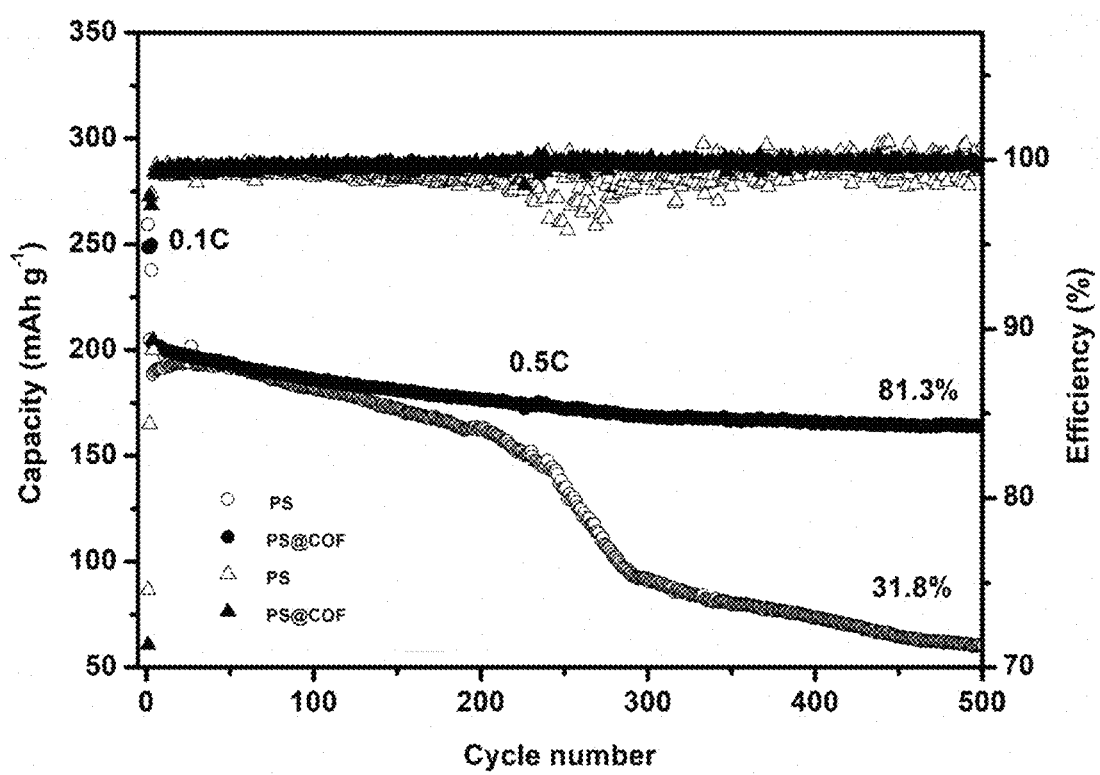
FIG. 5 is a battery charge-discharge cycle diagram of a lithium ion battery with lithium-rich as a cathode material in which the COFs modified separator is applied according to example 3.

A cyclic voltammetry measurement was performed after the prepared separator was assembled into a battery. FIG. 5 is a cycle diagram of a half-cell prepared with two different separators using lithium-rich as the cathode material. It can be seen by comparison that at normal temperature, 3 charge-discharge cycles were carried out on a half-cell prepared by the separator synthesized by mixing the COFs and a half-cell prepared by the commercial separator at a rate of 0.1 C, a specific capacity was maintained at 250 mAh/g, and a coulombic efficiency was 100% after 3 cycles. It can be found that when the two batteries were subjected to 500 charge-discharge cycles at a rate of 0.5 C, the specific capacity of the half-cell prepared by this method was 250 mAh/g to 175 mAh/g, while the specific capacity of the half-cell prepared by the general method was 200 mAh/g to 50 mAh/g. After 500 cycles, the coulombic efficiency of the former was 81.3%, While the latter was 31.8%, indicating that when using lithium-rich as a cathode material, the half-cell synthesized by the separator prepared by the method in Example 1 of the present disclosure can have significantly more excellent stability and energy storage potential.

The technical features of the embodiments described above may be arbitrarily combined. For the sake of brevity of description, not all possible combinations of the technical features in the aforementioned embodiments are described. However, as long as there is no contradiction between the combinations of these technical features, all should be considered as the scope of this specification.

The aforementioned examples only express several implementations of the present disclosure, and the descriptions thereof are more specific and detailed, but they cannot be understood as a limitation on the scope of the present disclosure. It should be noted that, for those who skilled in the art, a plurality of modifications and improvements can be made without departing from the concept of the present disclosure, which all belong to the protection scope of the present disclosure. Therefore, the protection scope of the present disclosure shall be subject to the appended claims.

What is claimed is:

1. A lithium ion battery, comprising a battery separator, wherein a surface of the battery separator is coated with a battery separator coating material, and the battery separator coating material is made of PVDF, a covalent organic framework, and N-methylpyrrolidone;
PVDF, the covalent organic framework, and N-methylpyrrolidone have a mass ratio of 20:(70-85):(5-10);
the battery separator being disposed between a cathode piece and an anode piece of the lithium ion battery; and
wherein an active material of the cathode piece is lithium cobaltate, lithium manganate, lithium nickelate, lithium nickel manganate, lithium-rich or lithium iron phosphate.

2. A battery separator, wherein a surface of the battery separator is coated with a battery separator coating material, and the battery separator coating material is made of PVDF, a covalent organic framework, and N-methylpyrrolidone; PVDF, the covalent organic framework, and N-methylpyrrolidone have a mass ratio of 20:(70-85):(5-10); and
a coating thickness of the battery separator coating material ranges from 50 μm to 80 μm.

3. A lithium ion battery, comprising the battery separator according to claim 2, the battery separator being disposed between a cathode piece and an anode piece of the lithium ion battery.

4. The lithium ion battery according to claim 3, wherein the lithium ion battery is a button battery or a pouch battery.

5. The lithium ion battery according to claim 3, wherein an active material of the anode piece is artificial graphite, natural graphite, mesophase carbon microspheres or metallic lithium sheets.

* * * * *